US009495369B2

(12) United States Patent
Sung et al.

(10) Patent No.: US 9,495,369 B2
(45) Date of Patent: Nov. 15, 2016

(54) COMPUTER FOR CONTROLLING BUS SWITCH TO CONTROL ACCESS TO A STORAGE UNIT BASED UPON FILE SHARING SETTING IN A BOOT STATE

(71) Applicant: Wistron Corporation, New Taipei (TW)

(72) Inventors: Yung-Chi Sung, New Taipei (TW); En-Shan Tsuei, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 297 days.

(21) Appl. No.: 14/077,271

(22) Filed: Nov. 12, 2013

(65) Prior Publication Data

US 2014/0344561 A1    Nov. 20, 2014

(30) Foreign Application Priority Data

May 17, 2013  (TW) .............................. 102117640 A

(51) Int. Cl.
| G06F 9/00 | (2006.01) |
| G06F 15/177 | (2006.01) |
| G06F 17/30 | (2006.01) |
| G06F 1/32 | (2006.01) |
| G06F 9/44 | (2006.01) |
| G06F 1/26 | (2006.01) |
| G06F 9/445 | (2006.01) |

(Continued)

(52) U.S. Cl.
CPC ........... *G06F 17/30082* (2013.01); *G06F 1/26* (2013.01); *G06F 1/3221* (2013.01); *G06F 1/3268* (2013.01); *G06F 1/3287* (2013.01); *G06F 1/3296* (2013.01); *G06F 9/4401* (2013.01); *G06F 3/061* (2013.01); *G06F 3/067* (2013.01); *G06F 3/0635* (2013.01); *G06F 3/0683* (2013.01); *G06F 13/4022* (2013.01); *G06F 2009/44531* (2013.01); *Y02B 60/1246* (2013.01); *Y02B 60/1282* (2013.01)

(58) Field of Classification Search
CPC .................. G06F 3/067; G06F 13/4022; G06F 3/0683; G06F 3/061; G06F 3/0635; G06F 2009/44531

See application file for complete search history.

(56) References Cited

U.S. PATENT DOCUMENTS

| 8,411,905 B2 | 4/2013 | Paris et al. | |
| 2006/0023574 A1* | 2/2006 | Weisser ................ | G06F 3/0607 369/30.1 |

(Continued)

*Primary Examiner* — Xuxing Chen
(74) *Attorney, Agent, or Firm* — McClure, Qualey & Rodack, LLP

(57) ABSTRACT

A computer host comprises a first system control chip and a control unit. The file sharing circuit comprises a second system control chip, a bus switch, a power switch and a sharing button. The bus switch controlled by the control unit couples a storage apparatus to the first or the second system control chip. The power switch is controlled by the control unit to supply power to the storage apparatus, the second system control chip and the bus switch. The sharing button enables or disables a file sharing procedure and electrically connects to the first system control chip and the second system control chip. When the file sharing procedure is enabled, the control unit controls the bus switch to switch to a first state, such that the second system control chip accesses the storage apparatus.

18 Claims, 6 Drawing Sheets

(51) Int. Cl.
*G06F 3/06* (2006.01)
*G06F 13/40* (2006.01)

(56) References Cited

U.S. PATENT DOCUMENTS

| | | | | |
|---|---|---|---|---|
| 2008/0184042 A1* | 7/2008 | Parks | ................... | G06F 1/3203 713/300 |
| 2009/0112884 A1* | 4/2009 | Sathath | ................. | G06F 3/0625 |
| 2011/0135196 A1 | 6/2011 | Paris et al. | | |
| 2012/0030433 A1* | 2/2012 | Zhang | ................... | G06F 1/3293 711/147 |
| 2012/0113228 A1* | 5/2012 | Konno | ............... | H04N 13/0239 348/47 |
| 2012/0250241 A1* | 10/2012 | Minemura | ............ | G06F 1/1641 361/679.21 |
| 2013/0097363 A1* | 4/2013 | Tan | .................... | G06F 12/0238 711/103 |
| 2014/0068317 A1* | 3/2014 | Kanigicherla | ........ | G06F 9/5011 714/2 |

* cited by examiner

COMPUTER FOR CONTROLLING BUS SWITCH TO CONTROL ACCESS TO A STORAGE UNIT BASED UPON FILE SHARING SETTING IN A BOOT STATE This application claims the benefit of Taiwan application Serial No. 102117640, filed May 17, 2013, the subject matter of which is incorporated herein by reference.

BACKGROUND OF THE INVENTION

1. Field of the Invention

The invention relates in general to an electronic apparatus, and more particularly to a computer.

2. Description of the Related Art

Along with the advance and innovation of technology, more and more varieties of electronic apparatus, are provided, and it is very common that a consumer may have several varieties of electronic apparatus such as mobile phone, tablet PC, notebook computer or desktop computer. However, problems such as same data being repetitively stored in different electronic apparatuses or same type of data being scattered and stored in different electronic apparatuses may add difficulty to data management or waste storage space.

To resolve the above problems, a network attached storage (NAS) apparatus is provided. The network attached storage apparatus is an electronic apparatus which is independent of a computer but allows the computer to access files through Internet connection. Concretely speaking, the network attached storage apparatus can be connected to one or more than one large-capacity disk drive, and allows users to access data stored in the disc drive through Internet connection.

However, such external type network attached storage apparatus must be placed on desktop or ground, and occupies extra space. The network attached storage apparatus is powered by an external power and requires a power plug. Since only a limited quantity of power plugs is available in the indoor, the network attached storage apparatus is not convenient to use. Therefore, how to make users conveniently share files between different electronic apparatuses has become a prominent task for the industries.

SUMMARY OF THE INVENTION

The invention is directed to a computer.

According to one embodiment of the present invention, a computer is disclosed. The computer comprises a computer host and the file sharing circuit. The file sharing circuit comprises a second system control chip, a bus switch, a power switch and a sharing button. The bus switch controlled by the control unit couples a storage apparatus to the first system control chip or the second system control chip. The power switch is controlled by the control unit to supply power to the storage apparatus, the second system control chip and the bus switch. The sharing button enables or disables a file sharing procedure and is electrically connected to the first system control chip and the second system control chip. When the file sharing procedure is enabled, the control unit controls the bus switch to switch to a first state, such that the second system control chip accesses the storage apparatus.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
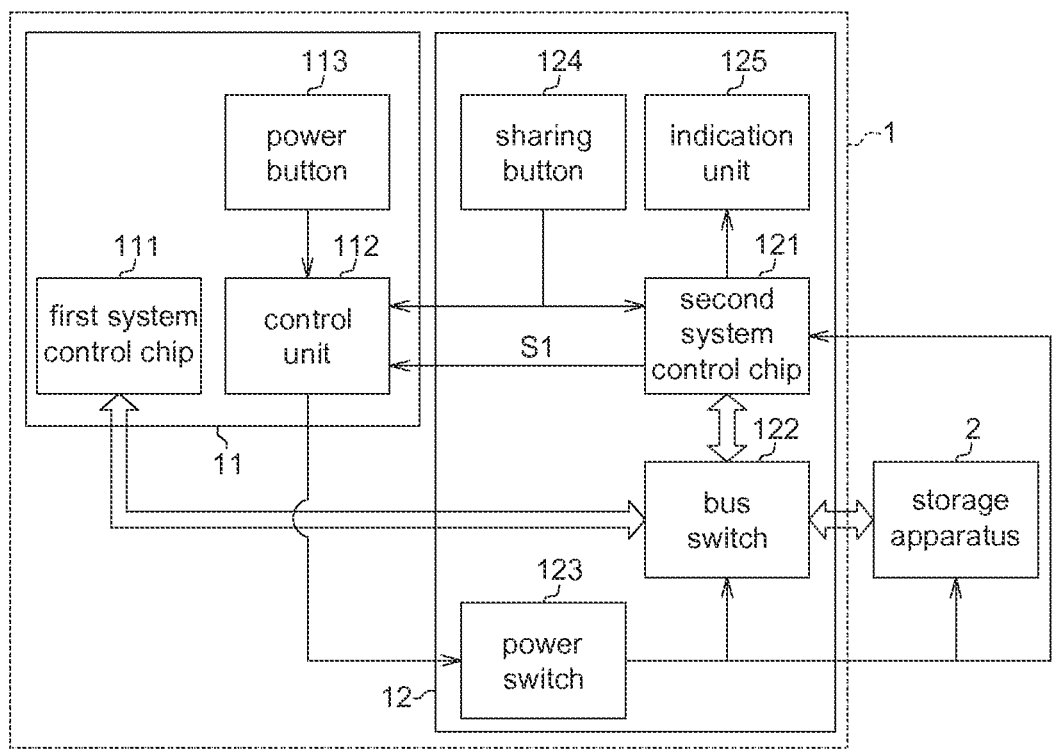
FIG. 1 is a schematic diagram of a computer according to an embodiment of the present invention.

Referring to FIG. 1, a schematic diagram of a computer according to an embodiment of the present invention is shown. The computer 1 comprises a computer host 11 and a file sharing circuit 12. The computer host 11 comprises a first system control chip 111, a control unit 112 and a power button 113. The control unit 112 is coupled to the first system control chip 111 and the power button 113. The first system control chip 111 is such as a chipset, and the control unit 112 is such as an embedded controller (EC). The power button 113 is used for booting or shutting down the computer. The file sharing circuit 12 comprises a second system control chip 121, a bus switch 122, a power switch 123, a sharing button 124 and an indication unit 125. The second system control chip 121 is coupled to the bus switch 122, the power switch 123, the sharing button 124 and the indication unit 125. The indication unit 125 indicates whether the file sharing procedure is enabled or disabled. For example, the indication unit 125 will be turned on when the file sharing procedure is enabled. Conversely, the indication unit 125 will be turned off when the file sharing procedure is disabled. When the second system control chip 121 accesses the storage apparatus 2, the indication unit 125 continuously flickers. The second system control chip 121 is such as a control chip of network attached storage (NAS), and the indication unit 125 is such as a light emitting diode.

The bus switch 122 is controlled by the control unit 112 to couple the storage apparatus 2 to the first system control chip 111 or the second system control chip 121. The power switch 123 is controlled by the control unit 112 to supply power to the storage apparatus 2, the second system control chip 121 and the bus switch 122. The power switch 123 is such as a switch. The storage apparatus 2 is such as a serial advanced technology attachment (SATA) hard disc in-built in the computer host 11 or a universal serial bus (USB) storage apparatus external to the computer host 11. In addition, the storage apparatus 2 is such as an external serial advanced technology attachment (e-SATA) hard disc.

The sharing button 124 is used for selecting whether to execute a file sharing procedure, and is electrically connected to the first system control chip 111 and the second system control chip 121. When the file sharing procedure is executed, the control unit 112 controls the bus switch to switch to a first state, such that the second system control chip 121 accesses the storage apparatus 2. When the file sharing procedure is not executed, the control unit 112 controls the bus switch 122 to switch to the second state, such that the first system control chip 111 accesses the storage apparatus 2.

Figure 7:
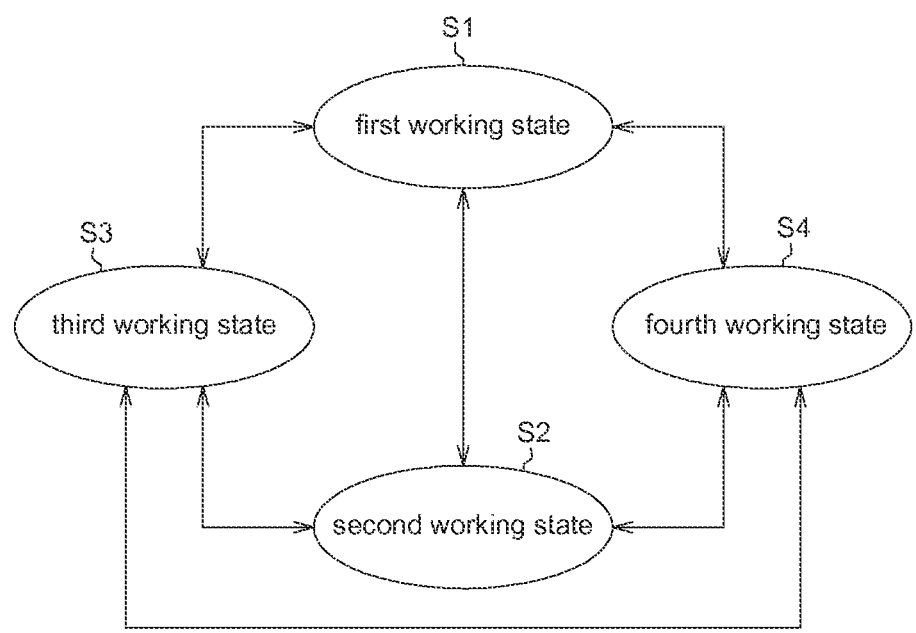
FIG. 7 is a schematic diagram of a first working state to a fourth working state of a computer according to an embodiment of the present invention.

Referring to FIG. 1 and FIG. 7. FIG. 7 is a schematic diagram of a first working state to a fourth working state of a computer according to an embodiment of the present invention. The disclosed computer 1 enters the first working state S1, the second working state S2, the third working state S3 or the fourth working state S4 of FIG. 7. When the computer 1 enters the first working state S1, this implies that the computer 1 is shut down and the second system control chip 121 activates a file sharing function. When the computer 1 enters the second working state S2, this implies that the computer 1 is shut down and the second system control chip 121 does not activate the file sharing function. When the computer 1 enters the third working state S3, this implies that the computer 1 is booted and the second system control chip 121 activates the file sharing function. When the computer 1 enters the fourth working state S4, this implies that the computer 1 is booted and the second system control chip 121 does not activate the file sharing function.

The user can use the sharing button 124 to selectively activate or not activate file sharing function. When the computer 1 is in the first computer working state S1, the user can use the sharing button 124 to switch the computer 1 to the second working state S2 from the first working state S1 to not activate file sharing function. When the computer 1 is in the second computer working state S2, the user can use the sharing button 124 to switch the computer 1 to the first working state S1 from the second working state S2 to activate the file sharing function. Similarly, when the computer 1 is in the third computer working state S3, the user can use the sharing button 124 to switch the computer 1 to the fourth working state S4 from the third working state S3 to not activate file sharing function. When the computer 1 is in the fourth computer working state S4, the user can use the sharing button 124 to switch the computer 1 to the third working state S3 from the fourth working state S4 to activate the file sharing function. When the user may use the network or the programs of software application of the computer to achieve disclosed functions of the sharing button 124, and such implementation is still within the scope of the design of the present invention.

The user can use the power button 113 to boot or to shut down the computer 1. When the computer 1 is in the first computer working state S1, the user can use the power button 113 to switch the computer 1 to the third working state S3 or the fourth working state S4 from the first working state S1, When the computer 1 is in the second computer working state S2, the user such that the computer 1 changes to the boot state from the shutdown state. can use the power button 113 to switch the computer 1 to the third working state S3 or the fourth working state S4 from the second working state S2, such that the computer 1 changes to the boot state from the shutdown state. The user of the computer may use network management or software application program of the computer to achieve disclosed functions of the computer the power button 113, and such implementation is still within the scope of design of the present invention.

When the computer 1 is in the third computer working state S3, the user can use the power button 113 to switch the computer 1 to the first working state S1 or the second working state S2 from the third working state S3, such that the computer 1 changes to the shutdown state from the boot state. When the computer 1 is in the fourth computer working state S4, the user can use the power button 113 to switch the computer 1 to the first working state S1 or the second working state S2 from the fourth working state S4, such that he computer 1 changes to the shutdown state from the boot state.

Figure 2:
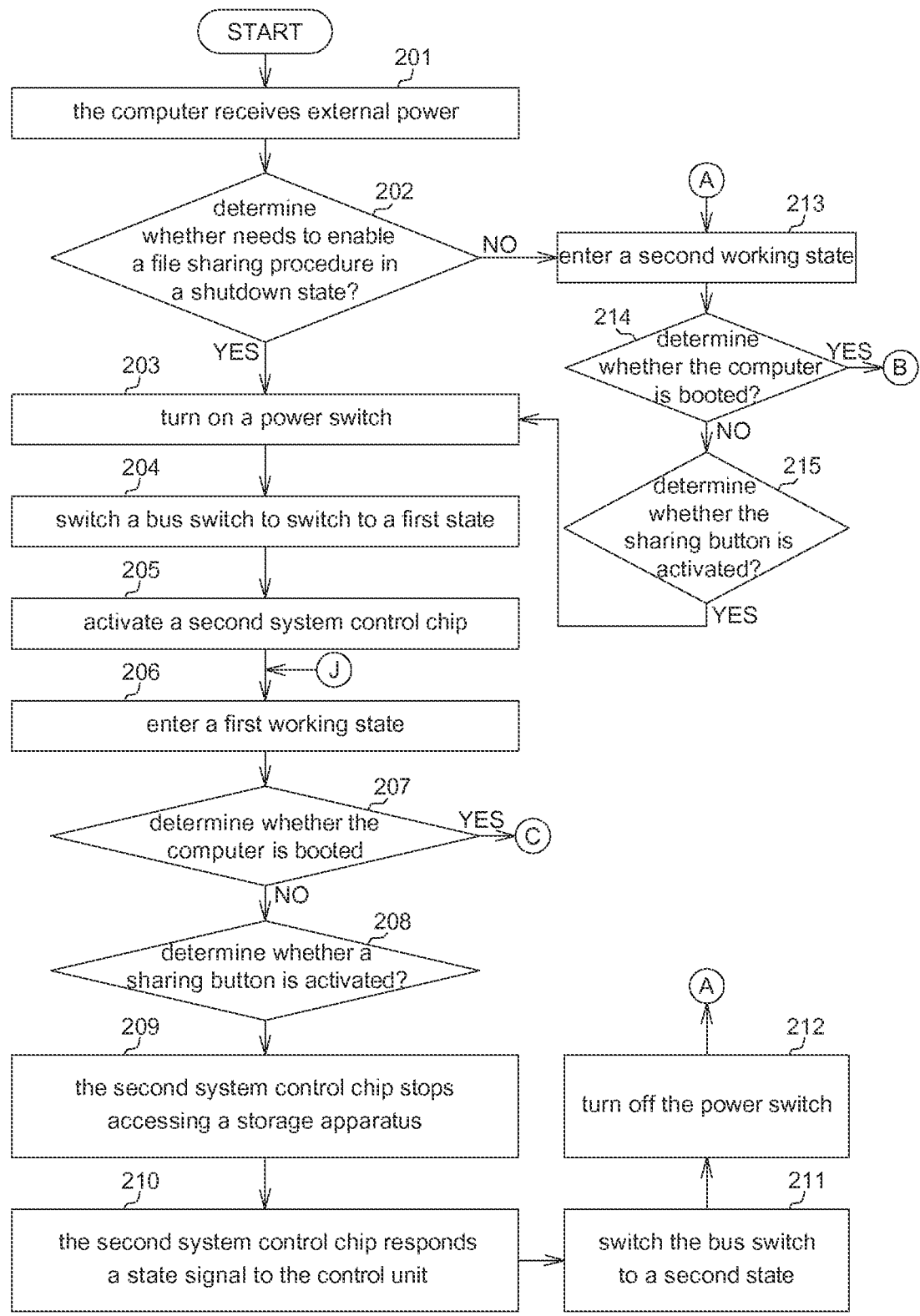
FIG. 2 is a first part of flowchart of a file sharing method according to an embodiment of the present invention.

Referring to FIG. 1, FIG. 2 and FIG. 7. FIG. 2 is a first part of flowchart of a file sharing method according to an embodiment of the present invention. FIG. 2 mainly illustrates procedures of the computer 1 entering the second working state S2 from the first working state S1 and entering the first working state S1 from the second working state S2. Firstly, the method begins at step 201. In step 201, the computer receives external power in a shutdown state. The shutdown state refers to a mode (S3) in which data of an advanced configuration and power interface (ACPI) is registered in a memory, or a shutdown mode (S5). Then, the method proceeds to step 202. In step 232, the control unit 112 determines whether the computer needs to enable a file sharing procedure in the shutdown state according to a shutdown setting. If the shutdown setting is to disable the file sharing procedure when the computer is in the shutdown state, then the method proceeds to step 213. In step 213, the file sharing procedure is disabled.

Conversely, if the shutdown setting is to enable the file sharing procedure when the computer is in the shutdown state, then the method proceeds to step 203. In step 203, the control unit 112 turns on the power switch 123 to supply power to the storage apparatus 2, the second system control chip 121 and the bus switch 122. Then, the method proceeds to step 204. In step 204, the control unit 112 controls the bus switch 122 to switch to a first state. In the first state, the second system control chip 121 is electrically connected to the storage apparatus 2 via the bus switch 122. After that, the method proceeds to step 205. In step 205, the second system control chip 121 is activated. Then, the method proceeds to step 206. In step 206, the computer 1 enters the first working state S1. When the computer 1 enters the first working state S1, this implies that the computer 1 is shut down and the second system control chip 121 activates the file sharing function. After the file sharing procedure is enabled, the second system control chip 121 can access the storage apparatus 2 via the bus switch 122. Then, the method proceeds to step 207. In step 207, whether the computer 1 is booted is determined during the process of enabling the file sharing procedure. If it is determined that the computer 1 is booted, then the computer 1 enters the third working state S3 or the fourth working state S4. Subsequent steps are further elaborated with accompanying drawing FIG. 4, and details are not repeated here.

If it is determined that the computer 1 is not booted, then the method proceeds to step 208. In step 208, during the process of enabling, whether the sharing button 124 is activated is determined. If it is determined that the sharing button 124 is activated, then the method proceeds to step 209. In step 209, the second system control chip 121 stops accessing the storage apparatus 2. Then, the method proceeds to step 210. In step 210, the second system control chip 121 responds a state signal R1 to the control unit 112, wherein the state signal R1 indicates that the second system control chip 121 is ready. After that, the method proceeds to step 211. In step 211, the control unit 112 controls the bus switch 122 to switch to a second state after receiving the state signal R1, wherein the first system control chip 111 is electrically connected to the storage apparatus 2 via the bus switch 122 in the second state. Then, the method proceeds to step 212. In step 212, the control unit 112 turns off the power switch 123 and stops supplying power to the storage apparatus 2, the second system control chip 121 and the bus switch 122. Then, the method proceeds to step 213. In step 213, the computer 1 enters the second working state. When the computer 1 enters the second working state S2, this implies that the computer 1 is shut down and the second system control chip 121 does not activate the file sharing function. After that, the method proceeds to step 214. In step 214, during the process of disabling the file sharing procedure, whether the computer 1 is booted is determined. If it is determined that the computer 1 is booted, then the computer 1 enters the third working state S3 or the fourth working state S4. Subsequent steps are further elaborated with accompanying drawing FIG. 3, and details are not repeated here. If it is determined that the computer 1 is not booted, then the method proceeds to step 215. In step 215, during the process of disabling the file sharing procedure, whether the sharing button 124 is activated is determined. If it is determined that the sharing button 124 is activated, then steps 203~206 are performed.

Figure 3:
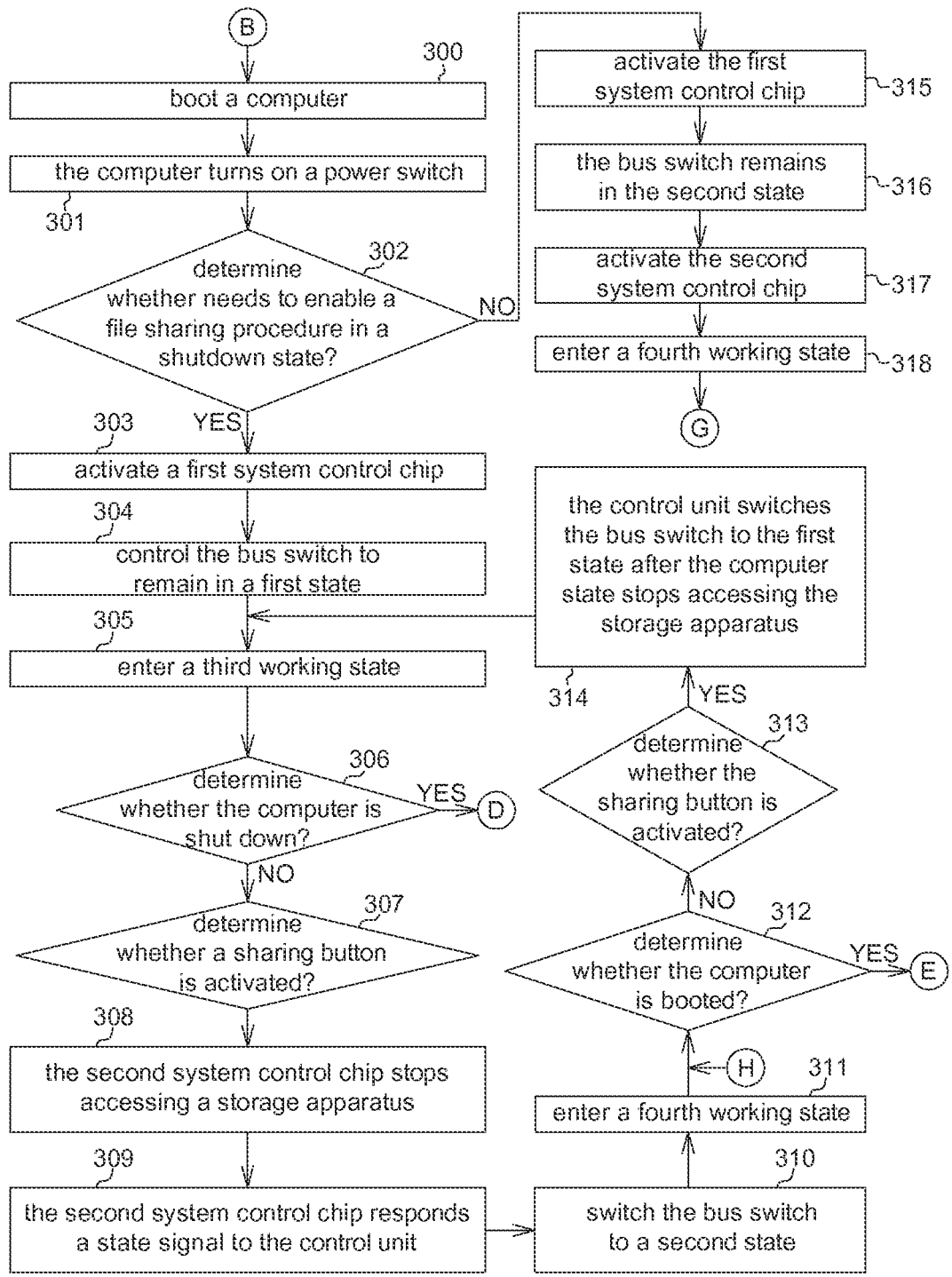
FIG. 3 is a second part of flowchart of a file sharing method according to an embodiment of the present invention.

Referring to FIG. 1, FIG. 2, FIG. 3 and FIG. 7. FIG. 3 is a second part of flowchart of a file sharing method according to an embodiment of the present invention. FIG. 3 mainly illustrates procedures of the computer 1 entering the third working state S3 or the fourth working state from the second working state S2 of FIG. 2 and entering the fourth working state S4 from the third working state S3. As disclosed in step 214, if it is determined that the computer 1 is booted, then the method proceeds to step 300. In step 300, the computer 1 is booted. Then, the method proceeds to step 301. In step 301, the control unit 112 of the computer 1 turns on the power switch 123 to supply power to the storage apparatus 2, the second system control chip 121 and the bus switch 122. In other words, the computer 1 is booted after the power button 113 is activated, and the control unit 112 turns on the power switch 123 to supply power to the storage apparatus 2, the second system control chip 121 and the bus switch 122. After that, the method proceeds to step 302. In step 302, the control unit 112 determines whether the computer 1 needs to enable a file sharing procedure in the boot state according to a shutdown setting.

If the boot setting is to not enable the file sharing procedure in the boot state, then the method proceeds to step 315. In step 315, the first system control chip 111 is activated. After that, the method proceeds to step 316. In step 316, the control unit 112 controls the bus switch 122 to remain in the second state. Then, the method proceeds to step 317. In step 317, the second system control chip 121 is activated. Then, the method proceeds to step 318. In step 318, the computer 1 enters the fourth working state S4. When the computer 1 enters the fourth working state S4, this implies that the computer 1 is booted and the second system control chip 121 does not activate the file sharing function. After step 318 is completed, the method proceeds to step 312. Detailed descriptions of step 312 will be disclosed below.

Conversely, if the boot setting is to enable the file sharing procedure in the boot state, then the method proceeds to step 303. In step 303, the first system control chip 111 is activated. After that, the method proceeds to step 304. In step 304, the control unit 112 controls the bus switch 122 to remain in the first state. After that, the method proceeds to step 305. In step 305, the computer 1 enters the third working state S3. When the computer 1 enters the third working state S3, this implies that the computer 1 is booted and the second system control chip 121 activates the file sharing function.

Then, the method proceeds to step 306. In step 306, during the process of enabling the file sharing procedure, whether the computer 1 is shut down is determined. If it is determined that the computer 1 is booted, then the computer 1 enters the first working state S1 or the second working state S2. Subsequent steps are further elaborated with accompanying drawing FIG. 5, and details are not repeated here. If it is determined that the computer 1 is not shut down, then the method proceeds to step 307. In step 307, during the process of enabling the file sharing procedure, whether the sharing button 124 is activated is determined. If it is determined that the sharing button 124 is activated, then the method proceeds to step 308. In step 308, the second system control chip 121 stops accessing the storage apparatus 2. Then, the method proceeds to step 309, the second system control chip 121 responds to a state signal R1 to the control unit 112, wherein the state signal R1 indicates that the second system control chip 121 is ready. After that, the method proceeds to step 310. In step 310, the control unit 112 controls the bus switch 122 to switch to the second state after receiving the state signal R1. In the second state, the first system control chip 111 is electrically connected to the storage apparatus 2 via the bus switch 122. Then, the method proceeds to step 311, the computer 1 enters the fourth working state S4. When the computer 1 enters the fourth working state S4, this implies that the computer 1 is booted and the second system control chip 121 does not activate the file sharing function.

After that, the method proceeds to step 312, whether the computer 1 is shut down is determined. If it is determined that the computer 1 is shut down, then the computer 1 enters the first working state S1 or the second working state S2. Subsequent steps are further elaborated with accompanying drawing FIG. 6, and details are not repeated here. If it is determined that the computer 1 is not shut down, then the method proceeds to step 313. In step 313, during the process of disabling the file sharing procedure, whether the sharing button 124 is activated is determined. If it is determined that the sharing button 124 is activated, then the method proceeds to step 314. In step 314, the control unit 112 switches the bus switch 122 to the first state after the computer state stops accessing the storage apparatus 2. In the first state, the second system control chip 121 is electrically connected to the storage apparatus 2 via the bus switch 122. Then, the method proceeds to step 305. In step 305, the computer 1 enters the third working state S3.

Figure 4:
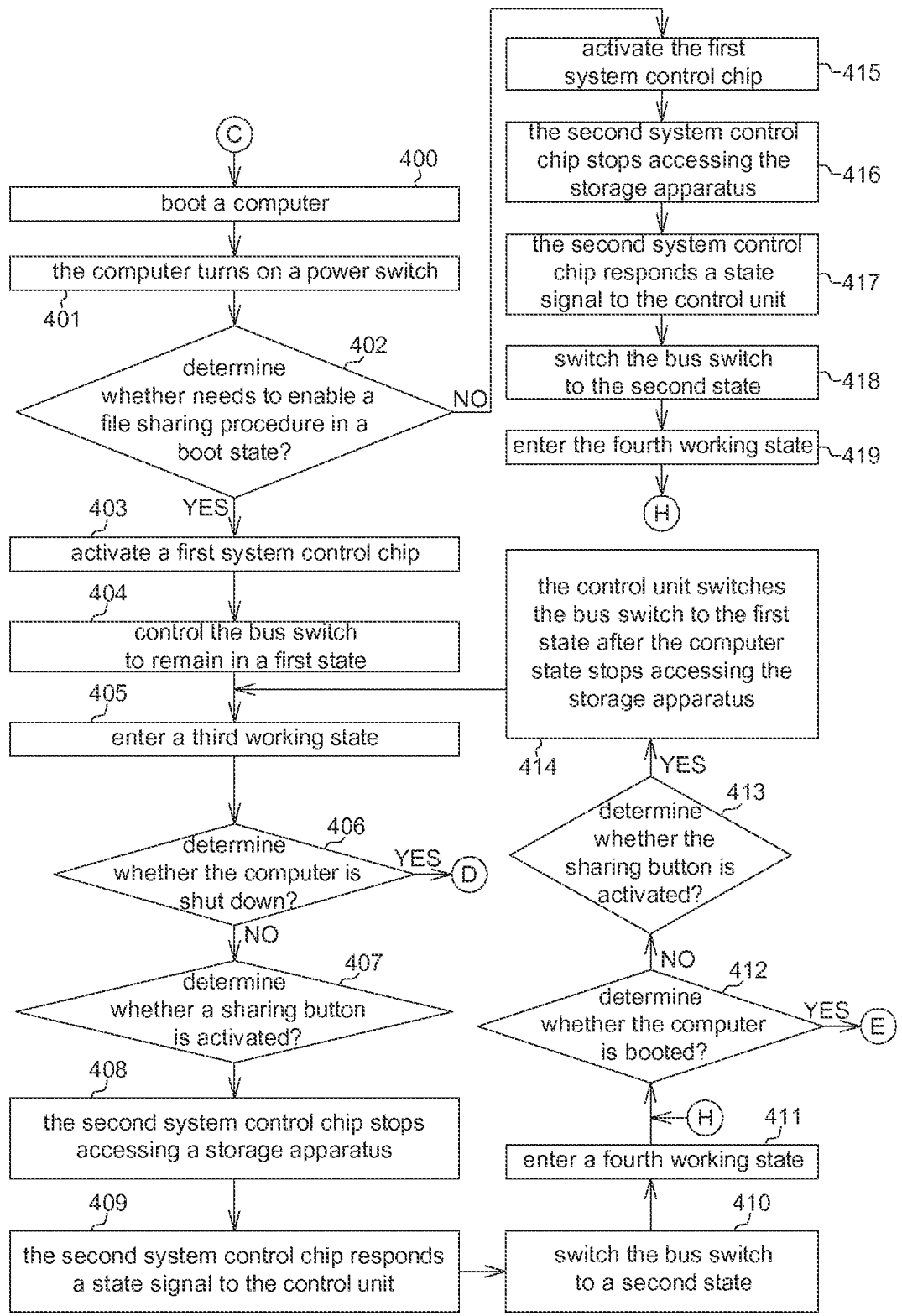
FIG. 4 is a third part of flowchart of a file sharing method according to an embodiment of the present invention.

Referring to FIG. 1, FIG. 2, FIG. 3, FIG. 4 and FIG. 7. FIG. 4 is a third part of flowchart of a file sharing method according to an embodiment of the present invention. FIG. 4 mainly illustrates procedures of the computer 1 entering the third working state S3 or the fourth working state S4 from the first working state S1 of FIG. 2 and entering the fourth working state S4 from the third working state S3.

In the disclosed step 207, if it is determined that the computer 1 is booted, then the method proceeds to step 400. In step 400, the computer 1 is booted. Then, the method proceeds to step 401. In step 401, the control unit 112 of the computer 1 turns on the power switch 123 to supply power to the storage apparatus 2, the second system control chip 121 and the bus switch 122. After that, the method proceeds to step 402. In step 402, the control unit 112 determines whether to enable the file sharing procedure in the boot state according to a boot setting.

If the boot setting is to not enable the file sharing procedure in the boot state, then the method proceeds to step 415. In step 415, the first system control chip 111 is activated. After that, the method proceeds to step 416. In step 416, the second system control chip 121 stops accessing the storage apparatus 2. Then, the method proceeds to step 417. In step 417, the second system control chip 121 responds a state signal R1 to the control unit 112. After that, the method proceeds to step 418. In step 418, the control unit 112 controls the bus switch 122 to switch to the second state. Then, the method proceeds to step 419. In step 419, the computer 1 enters the fourth working state S4. When the computer 1 enters the fourth working state S4, this implies that the computer 1 is booted and the second system control chip 121 does not activate the file sharing function. After step 419 is completed, the method returns to step 412. Detailed descriptions of step 412 will be disclosed below.

If the boot setting is to enable the file sharing procedure in the boot state, then the method proceeds to step 403. In step 403, the first system control chip 111 is activated. After that, the method proceeds to step 404. In step 404, the control unit 112 controls the bus switch 122 to switch to the first state. After that, the method proceeds to step 405. In step 405, the computer 1 enters the third working state S3. When the computer 1 enters the third working state S3, this implies that the computer 1 is booted and the second system control chip 121 activates the file sharing function.

Then, the method proceeds to step 406. In step 406, during the process of enabling the file sharing procedure, whether the computer 1 is shut down is determined. If it is determined that the computer 1 is booted, then the computer 1 enters the first working state S1 or the second working state S2. Subsequent steps are further elaborated with accompanying drawing FIG. 5, and details are not repeated here. If it is determined that the computer 1 is not shut down, then the method proceeds to step 407. In step 407, during the process of enabling the file sharing procedure, whether the sharing button 124 is activated is determined. If it is determined that the sharing button 124 is activated, then the method proceeds to step 408. In step 408, the second system control chip 121 stops accessing the storage apparatus 2. Then, the method proceeds to step 409. In step 409, the second system control chip 121 responds a state signal R1 to the control unit 112, wherein the state signal R1 indicates that the second system control chip 121 is ready. After that, the method proceeds to step 410. In step 410, the control unit 112 controls the bus switch 122 to switch to the second state after receiving the state signal R1. In the second state, the first system control chip 111 is electrically connected to the storage apparatus 2 via the bus switch 122. Then, the method proceeds to step 411. In step 411, the computer 1 enters the fourth working state S4. When the computer 1 enters the fourth working state S4, this implies that the computer 1 is booted and the second system control chip 121 does not activate the file sharing function.

After that, the method proceeds to step 412. In step 412, whether the computer 1 is shut down is determined. If it is determined that the computer 1 is shut down, then the computer 1 enters the first working state S1 or the second working state S2. Subsequent steps are further elaborated with accompanying drawing FIG. 6, and details are not repeated here. If it is determined that the computer 1 is not shut down, then the method proceeds to step 413. In step 413, during the process of disabling then the sharing procedure, whether the sharing button 124 is activated is determined. If it is determined that the sharing button 124 is activated, then the method proceeds to step 414. In step 414, after the computer state stops accessing the storage apparatus 2, the control unit 112 switches the bus switch 122 to the first state. In the first state, the second system control chip 121 is electrically connected to the storage apparatus 2 via the bus switch 122. Then, the method returns to step 405, the computer 1 enters the third working state S3.

Figure 5:
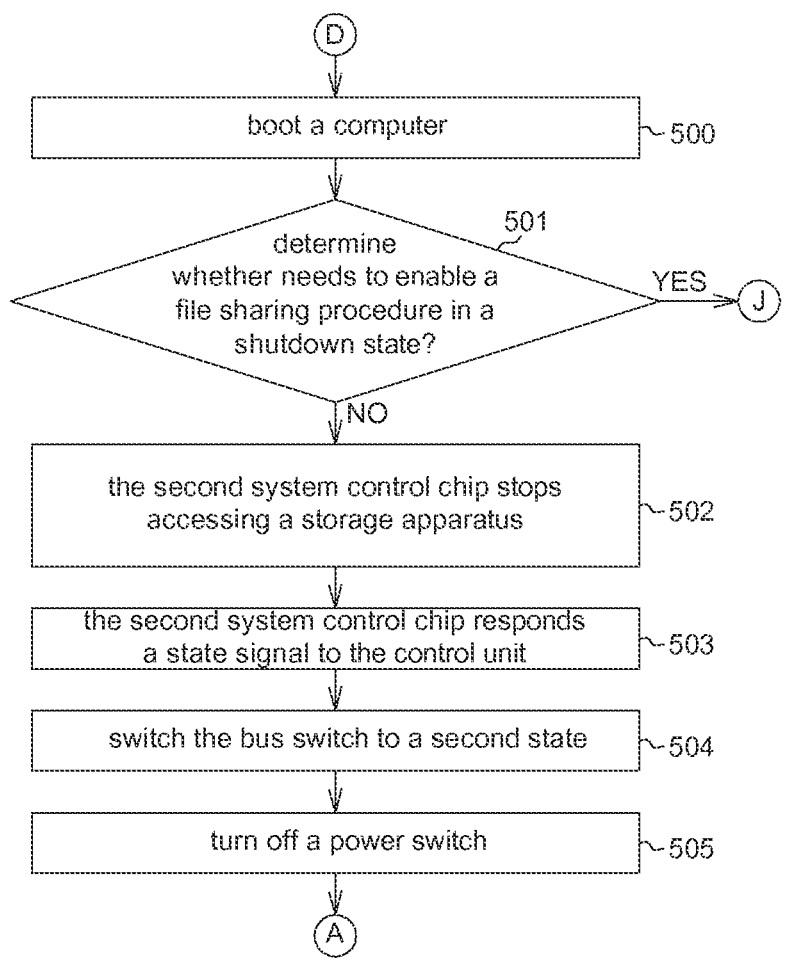
FIG. 5 is a fourth part of flowchart of a file sharing method according to an embodiment of the present invention.

Referring to FIG. 1, FIG. 2, FIG. 3, FIG. 5 and FIG. 7, FIG. 5 is a fourth part of flowchart of a file sharing method according to an embodiment of the present invention. FIG. 5 mainly illustrates procedures of the computer 1 entering the first working state S1 or the second working state S2 from the third working state S3 of FIG. 3 or FIG. 4. In the disclosed step 302, if the boot setting is to disable the file sharing procedure in the boot state, then the method proceeds to step 500. In the disclosed step 402, if the shutdown setting is to disable the file sharing procedure in the shutdown state, then the method proceeds to step 500. In step 500, the computer 1 is shut down. After that, the method proceeds to step 501. In step 501, the control unit 112 determines whether to enable the file sharing procedure in the shutdown state according to a shutdown setting. If it is determined that the file sharing procedure needs to be enabled in the shutdown state, then step 206 of FIG. 2 is performed. In step 206, the computer 1 enters the first working state S1. Conversely, if it is determined that the file sharing procedure needs to be disabled in the shutdown state, then the method proceeds to step 502. In step 502, the second system control chip 121 stops accessing the storage apparatus 2. After that, the method proceeds to step 503. In step 503, the second system control chip 121 responds a state signal R1 to the control unit 112, wherein the state signal R1 indicates that the second system control chip 121 is ready. Then, the method proceeds to step 504. In step 504, the control unit 112 controls the bus switch 122 to switch to the second state. After that, the method proceeds to step 505. In step 505, the control unit 112 turns off the power switch 123 and stops supplying power to the storage apparatus 2, the second system control chip 121 and the bus switch 122. Then, step 213 of FIG. 2 is performed. In step 213, the computer 1 enters the second working state.

Figure 6:
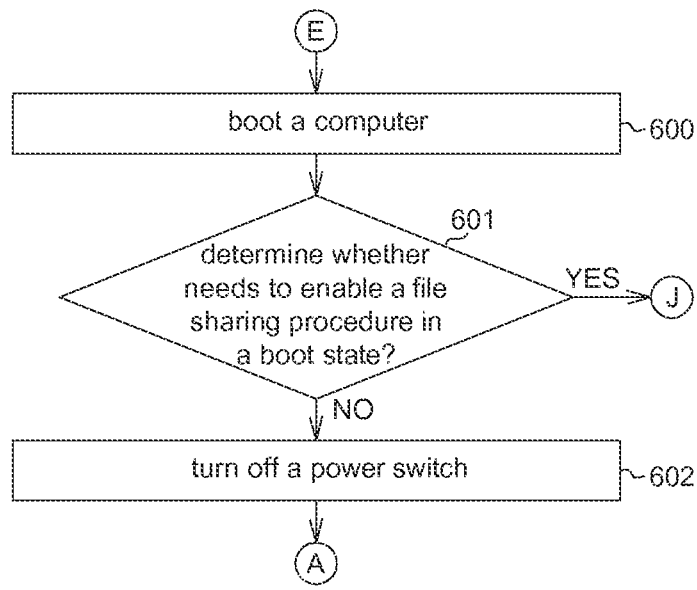
FIG. 6 is a fifth part of flowchart of a file sharing method according to an embodiment of the present invention.

Referring to FIG. 1, FIG. 2, FIG. 3, FIG. 6 and FIG. 7. FIG. 6 is a fifth part of flowchart of a file sharing method according to an embodiment of the present invention. FIG. 6 mainly illustrates procedures of the computer 1 entering the first working state S1 or the second working state S2 from the fourth working state S4 of FIG. 3 or FIG. 4. In the disclosed step 312 or 412, if it is determined that the computer 1 is shut down, then the method proceeds to step 600. In step 600, the computer 1 is shut down. After that, the method proceeds to step 601. In step 601, the control unit 112 determines whether to enable the file sharing procedure in the shutdown state according to a shutdown setting. If it is determined that the file sharing procedure needs to be enabled in the shutdown state, then step 206 of FIG. 2 is performed. In step 206, the computer 1 enters the first working state S1. Conversely, if it is determined that the file sharing procedure needs to be disabled in the shutdown state, then the method proceeds to step 602. In step 602, the control unit 112 turns off the power switch 123 and stops supplying power to the storage apparatus 2, the second system control chip 121 and the bus switch 122. Then, step 213 of FIG. 2 is performed. In step 213, the computer 1 enters the second working state S2.

The computer disclosed in above embodiments of the invention itself possesses a file sharing function. After the file sharing procedure is enabled, the second system control chip can access the storage apparatus through the bus switch.

In addition, the user can use the sharing button to select to enable or to disable the file sharing procedure, greatly improving convenience of use.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer, comprising:
a computer host, comprising:
a first system control chip; and
a control unit; and
a file sharing circuit, comprising:
a second system control chip;
a bus switch controlled by the control unit to couple a storage apparatus to the first system control chip or the second system control chip;
a power switch controlled by the control unit to supply power to the storage apparatus, the second system control chip and the bus switch; and
a sharing button used for enabling or disabling a file sharing procedure and electrically connected to the first system control chip and the second system control chip, wherein the control unit controls the bus switch to switch to a first state when the file sharing procedure is enabled and the computer host is booted, such that the second system control chip accesses the storage apparatus, and controls the bus switch to switch to a second state when the file sharing procedure is disabled, such that the first system control chip accesses the storage apparatus;
wherein the computer further comprises a power button;
after enabling the power switch, the control unit determines whether to enable the file sharing procedure in a boot state according to a boot setting, and if the boot setting is to enable the file sharing procedure in the boot state, then the control unit controls the bus switch to remain in the first state.

2. The computer according to claim 1, wherein after receiving external power in a shutdown state, the control unit determines whether to enable the file sharing procedure in the shutdown state according to a shutdown setting.

3. The computer according to claim 2, wherein if the shutdown setting is to enable the file sharing procedure in the shutdown state, then the control unit turns on the power switch to supply the power to the storage apparatus, the second system control chip and the bus switch.

4. The computer according to claim 3, wherein after enabling the power switch, the control unit controls the bus switch to switch to the first state.

5. The computer according to claim 4, wherein during the process of enabling the file sharing procedure, if the sharing button is activated, then the second system control chip stops accessing the storage apparatus and responds a state signal to the control unit, and the control unit, after receiving the state signal, controls the bus switch to switch to the second state.

6. The computer according to claim 5, wherein the control unit turns off the power switch and stops supplying the power to the storage apparatus, the second system control chip and the bus switch.

7. The computer according to claim 2, wherein if the shutdown setting is to disable the file sharing procedure in the shutdown state, then the control unit determines whether the sharing button is activated, and if the sharing button is activated, then the control unit turns on the power switch to supply the power to the storage apparatus, the second system control chip and the bus switch.

8. The computer according to claim 7, wherein after enabling the power switch, the control unit controls the bus switch to switch to the first state.

9. The computer according to claim 1, wherein the control unit turns on the power switch after the power button is activated.

10. The computer according to claim 1, wherein when the bus switch remains in the first state, if the sharing button is activated, then the second system control chip stops accessing the storage apparatus and responds a state signal to the control unit, which controls the bus switch to switch to the second state after receiving the state signal.

11. The computer according to claim 1, wherein if the boot setting is to disable the file sharing procedure in the boot state, then the second system control chip stops accessing the storage apparatus after having been informed by the control unit.

12. The computer according to claim 11, wherein after the second system control chip stops accessing the storage apparatus, the control unit controls the bus switch to switch to the second state.

13. The computer according to claim 9, wherein after the computer changes to a shutdown state from the boot state, when the computer receives external power in the shutdown state, the control unit determines whether to enable the file sharing procedure in the shutdown state according to a shutdown setting.

14. The computer according to claim 1, wherein after the computer changes to a shutdown state from the boot state, when the computer receives external power in the shutdown state, the control unit determines whether to enable the file sharing procedure in the shutdown state according to a shutdown setting.

15. The computer according to claim 10, wherein after the computer changes to a shutdown state from the boot state, when the computer receives external power in the shutdown state, the control unit determines whether to enable the file sharing procedure in the shutdown state according to a shutdown setting.

16. The computer according to claim 11, wherein after the computer changes to a shutdown state from the boot state, when the computer receives external power in the shutdown state, the control unit determines whether to enable the file sharing procedure in the shutdown state according to a shutdown setting.

17. The computer according to claim 12, wherein after the computer changes to a shutdown state from the boot state, when the computer receives external power in the shutdown state, the control unit determines whether to enable the file sharing procedure in the shutdown state according to a shutdown setting.

18. The computer according to claim 1, further comprising:
an indication unit used for indicating whether the file sharing procedure is enabled or disabled.

* * * * *